July 11, 1939.   L. K. DAVIS   2,165,839
FUEL CONSUMPTION INDICATOR
Filed Feb. 14, 1935   2 Sheets-Sheet 1

INVENTOR
Lincoln K. Davis
BY
ATTORNEY

July 11, 1939.  L. K. DAVIS  2,165,839
FUEL CONSUMPTION INDICATOR
Filed Feb. 14, 1935  2 Sheets-Sheet 2

Fig. 5.

INVENTOR.
Lincoln K. Davis
BY
ATTORNEY

Patented July 11, 1939

2,165,839

UNITED STATES PATENT OFFICE 2,165,839

FUEL CONSUMPTION INDICATOR

Lincoln K. Davis, Brockton, Mass.

Application February 14, 1935, Serial No. 6,602

10 Claims. (Cl. 73—51)

My invention relates to efficiency meters and particularly to means for providing a continuous indication of the ratio between work performed by an engine and the corresponding fuel consumption of the latter. In the case of an engine driving an automobile, distance traveled is, caeteris paribus, proportional to the work performed, so this ratio may be expressed conveniently in terms of miles per gallon.

Various devices and methods for accomplishing this have been suggested in the past, and they may be for the most part divided for purposes of consideration into two general classes, as follows:

First, the type operating on the principle of correlating distance traveled per unit time, as miles per hour, with fuel consumed per unit time, as gallons per hour. Division of miles per hour by gallons per hour gives as a quotient the desired term of miles per gallon, as the quantity representing time cancels out.

Second, the type operating on the principle of correlating distance, as miles, with the fuel, as gallons, consumed in traveling that distance. Division of miles by gallons gives miles per gallon directly, as the unnecessary quantity representing time is not involved in this case.

Devices of the first type have been proposed in which a force proportional to the velocity of the engine or vehicle, as expressed for example in miles per hour, is opposed to another force produced by or proportional to the fuel flow, as expressed for example in gallons per hour, which gives in effect a subtraction of one force from another, the resultant being interpreted in terms of miles per gallon. This method will give accurate readings under widely varying conditions only if the forces opposed to each other are in an exponential relation to the motions by which they are produced, since a mathematical division must be effectively accomplished, and to perform this by the process of subtraction requires that logarithms be used.

Any device which fails to take account of these mathematical principles will give correct results only under severely limited conditions, namely, for example at a certain fixed value of either one or the other of the two variables. For instance, if a calibration is made for different conditions of engine work performed at one certain speed, the readings will be correct at this speed alone, and incorrect at all others. Likewise, a calibration for different engine speeds at one certain rate of fuel flow will give correct readings at this fuel flow rate and at no other. Many of the devices proposed in the past do not take into consideration this necessarily logarithmic relation, and therefore do not accomplish their intended purpose, while those devices in which it is considered are both complicated and delicate.

Devices of the second type have been designed in which the required division is accomplished directly by taking a reading of the distance traveled in consuming a certain amount of fuel, usually a small amount such as less than one gallon, but in general such an amount that readings are intermittent, separated by comparatively great intervals such as minutes, during which no reading of the instantaneous fuel consumption is possible.

By the apparatus of my invention, the readings given of the fuel consumption efficiency of an automobile engine for example, are very nearly instantaneous, the time lag between the actual consumption of fuel and the indication of its relation to the distance traveled being of the order of one or two seconds or even less, so that a nearly continuous observation is possible, showing rapidly and plainly the effect of factors which affect the fuel consumption over a short period only, such as rapid acceleration, deceleration, gusts of wind, climbing or descending small hills, and other similar changes in the effective work performed by the automobile motor.

One form of my invention is adaptable to any engine having a fuel feeding or pumping mechanism which operates in a fashion so that every cycle of its operation is in a definite proportion to the operation of the engine or the distance traveled by the vehicle driven by such engine.

My invention is especially adapted for use with an automobile engine having a mechanical fuel pump driven directly by the engine, which form of drive is common practice. In the usual case, this pump may be driven from the camshaft of a four-stroke-cycle engine for example, so that the pump completes one cycle for every two revolutions of the engine crankshaft. When the engine is coupled to the wheels, as for example when the automobile is coupled to the engine so as to be in "high gear", there then is a definite relation between the distance traveled by the automobile and the operative cycle of the fuel pump, depending inter alia, on the gearing between the engine and the driving wheels, the effective circumference of the latter, wheel slippage and other well-known factors, so that the automobile travels a substantially definitely known distance during the time while the fuel pump completes one cycle of its operation.

One type of pump to which the device of my invention is applicable is that type which is so designed that its maximum pumping capacity is in excess of the greatest demands of the engine, but in which type provision is made for supplying thereby to the engine only as much fuel as the engine requires at any given moment of time. This reserve capacity appears in the form of lost motion in the pump actuating mechanism, as hereinafter set forth.

During one complete cycle of the pump operation there is delivered to the engine and consumed thereby only that amount of fuel which is required to drive the automobile the distance corresponding to one pump cycle of operation.

The following example may serve to make clearer the interaction of the various factors involved in my invention. Assume that the values of wheel circumference and gear ratio of a given automobile are such that it travels 1/1400 mile for each cycle of the fuel pump operation and further assume that the fuel consumption under certain operating conditions is 1/25,000 gallon, which ratio can be simplified and be expressed as approximately 18 miles per gallon. Under other operating conditions the fraction of a gallon consumed per pump cycle may be different, but the distance traveled per pump cycle will not, as long as the wheel circumference, gear ratio and other factors previously mentioned remain substantially constant, which they will remain when the engine is driving the automobile in "high gear". Therefore the desired indication in miles per gallon will depend only upon the amount of fuel consumed per pump cycle. If this latter factor can be determined and quickly indicated, a knowledge of the fuel consumption can be had continuously, from one cycle to the next.

As under the usual conditions of operation these cycles occur in comparatively rapid succession, an observation of the fuel consumption in terms of miles per gallon may be made almost instantaneously, relative to the apperceptive ability of an observer, at any time and under any ordinary conditions of operation, as when the automobile is in "high gear".

As this invention includes a means of interpreting in terms of miles per gallon the amount of fuel supplied to the engine by the fuel pump per cycle of the latter, irrespective of engine or fuel velocity, it is of the second type described above, and as it operates in conjunction with the fuel pump, a thorough understanding of the latter is necessary.

In order better to illustrate my invention and its employment I have hereunto appended drawings showing my invention and various modifications thereof, as used in conjunction with an internal combustion engine, such as an automobile type gasoline motor.

In the case of all these drawings I have indicated merely such portions of a complete engine as are necessary to an understanding of this invention, since the portions omitted are well known in the automotive art and may be of widely varying types and details of construction.

Figures 1, 1A:
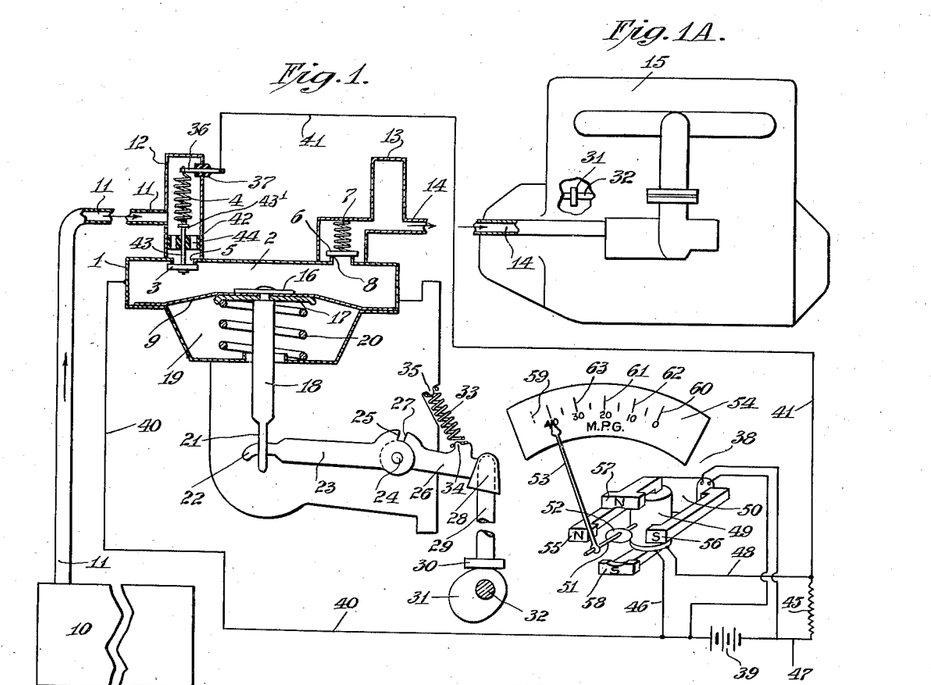
Fig. 1 represents one form of my invention constituting an integral part of the fuel pump assembly, and including the efficiency indicating device.
Fig. 1A shows a side elevation of a typical automotive motor, cut away in order to show the feed pump drive mechanism.

Referring now especially to Figs. 1 and 1A, there has been shown a fuel pump of the type customarily used, with the exception of the inlet valve which has been modified for reasons hereinafter to be explained, consisting of a metal pump body 1 having a pump chamber 2, with an inlet valve 3 held against its seat 5 by a tension spring 4, and an outlet valve 6, held against its seat 8 by a compression spring 7. One wall of the pump chamber 2 is formed by a flexible diaphragm 9, made for example of several plies of treated fabric, the latter being clamped between two washers 16 and 17, which are riveted to the upper end of a pull rod 18. Below diaphragm 9 is another bowl-shaped portion 19 of body 1, in which is a compression spring 20 bearing against the bottom of the bowl 19 at its lower end, and against washer 17 at its upper end, and tending to force diaphragm 9 upward, or into the pump chamber 2. Pull rod 18 has a slot 21 at its lower end, through which hook 22 may engage it, this hook being formed on one end of arm 23, the other end of which arm is pivoted on a shaft 24. The pivoted end of arm 23 is formed with a face 25, radially disposed with respect to the shaft 24.

On the same shaft is pivoted a second arm 26, having a similar radially disposed face 27, opposite face 25. The two arms 23 and 26 are free to turn independently on shaft 24, except when faces 25 and 27 are in contact and arm 26 is moving counterclockwise, in which case arm 23 is forced also to move in the same direction.

However, it will be seen that arm 26 may move in a clockwise direction independently of arm 23, without causing the latter necessarily to follow the motion of the former.

Cup 28 is attached to arm 26 at its outer end, and receives the upper end of push rod 29, the latter having a widened lower end 30 which bears against cam 31 on the camshaft 32 of the engine 15. A compression spring 33, bearing against a shoulder 35 on body 1 at one end, and on the other end against a boss 34 on arm 26, urges arm 26 in a clockwise direction, causing cup 28 to bear against push rod 29, and the latter to bear against cam 31 in all its positions, so that arm 26 is at all times responsive with substantially no lost motion to the motion imparted thereto by the rotation of cam 31.

Downward motion of diaphragm 9 produces a pressure lower than atmospheric in pump chamber 2, which causes fuel to flow under atmospheric pressure from fuel tank 10 through piping 11 into air dome 12, to open inlet valve 3 against the seating force of spring 4 and to fill pump chamber 2. Upward motion of diaphragm 9 produces a pressure higher than atmospheric in pump chamber 2, which causes inlet valve 3 to close and outlet valve 6 to open, whereupon fuel is forced through the latter valve into air dome 13, and thence through piping 14 into engine 15.

In the usual case the engine is provided with a carburetor having mechanism to permit ingress of liquid fuel in proportion to the engine's requirements, no more and no less. This mechanism is well known in the art, and need not here be described in detail, more than to state that it may consist of the usual float chamber, float, lever, and valve, which operate in such a manner that the amount of fuel which the carburetor will accept automatically adjusts itself to the requirements of the engine.

The simple fuel pumping action produced by motion of the diaphragm 9 has been outlined above, but the manner in which the amount of fuel pumped is limited by the amount which the engine will accept will now be explained:

As cam 31 turns and lifts push rod 29, arm 26 is caused to turn in a counterclockwise direction, and as explained above, arm 23 must also turn in the same direction, and in so doing pull diaphragm 9 downward to its bottom limit against spring 20. This motion fills chamber 2 with fuel, as explained previously. As cam 31 continues to turn, push rod 29 falls, and arm 26 turns clockwise, but cannot now cause arm 23 to follow its motion, as also explained above. Spring 20 now pushes the diaphragm 9 upward, causing fuel to flow out of chamber 2 into the engine 15, as explained, until the latter has taken all that it requires, and by means of its carburetor float mechanism builds up a back pressure until the force exerted by spring 20 is balanced, at which point the upward motion of the diaphragm 9 stops and the outlet valve 6 closes.

The fuel pump is usually so proportioned that the normal requirements of the engine with which it is used are met when the diaphragm has traveled upward only a small fraction of its possible stroke, so that ordinarily pull rod 18 lifts the hooked end 22 of arm 23 only a short distance, and thus turns arm 23 but slightly in a clockwise direction, compared with its possible motion if diaphragm 9 were to travel to the limit of its possible upward stroke. As arm 26 follows the motion produced by cam 31 at all times, it moves clockwise an angular distance corresponding to a full stroke of diaphragm 9, and as arm 23 moves clockwise an angular distance corresponding only to the actual stroke of diaphragm 9, faces 25 and 27 necessarily separate from each other to an extent determined by the difference of angular motions in the case of the two arms respectively.

Cam 31 continues turning and reaches a position in which arm 26 is at the furthermost limit of its clockwise motion, and then once more causes arm 26 to turn counterclockwise, when face 27 comes in contact with face 25 and causes arm 23 to turn counterclockwise again, and diaphragm 9 is once more pulled downward to its bottom limit, fresh fuel then entering chamber 2. Further motion of cam 31 releases spring 20 once more and the latter again pushes diaphragm 9 upward and supplies fuel to the engine 15.

From the action described above, it is apparent that as much fuel is taken into chamber 2 on each intake stroke as was supplied to the engine 15 during the immediately preceding output stroke, for both strokes are of the same length. This length is determined not only by the amount of fuel actually pumped, but also by any lost motion in the diaphragm itself, due to stretching, etc., but such lost motion during the output stroke will be offset by an equal lost motion during the intake stroke, as the stresses on the diaphragm are reversed. This lost motion is a variable depending on the condition of the diaphragm, but as it cancels out automatically, the amount of fuel drawn in during each intake stroke may be taken as a measure of that supplied to the engine during the preceding output stroke.

For example, assuming a certain amount of lost motion, and considering the output stroke, the diaphragm 9 first moves upward a distance sufficient to take up this lost motion before any fuel is pumped. At this point it is taut and tending to bulge outwardly with respect to chamber 2, and any further motion forces fuel out of chamber 2 into the engine 15, until back pressure from the latter produced by the carburetor float mechanism stops this upward motion, or slows it until cam 31 turns sufficiently to cause diaphragm 9 to be pulled downward once more.

At the start of the downward motion, or intake stroke, the stresses on diaphragm 9 are reversed, and it moves downward a distance sufficient to take up the lost motion before any fresh fuel is drawn into chamber 2. At this point the diaphragm 9 tends to bulge inwardly with respect to chamber 2, and from here to the completion of the intake stroke, fuel is taken into chamber 2.

It will be seen that the effective or actual pumping part of the output stroke starts at a point relative to the bottommost or starting position of the diaphragm 9, depending on the amount of lost motion in the latter, and ends at a point determined by the volume of fuel supplied to the engine, so that any change in the amount of lost motion will affect the starting and ending points of the actual supply part of the output stroke.

As the diaphragm 9 is driven by spring 20 on the output stroke, and is then not directly connected to the engine, the fraction of the complete pump cycle during which fuel is being supplied to the engine depends only on the rate at which the latter will accept fuel. Under certain conditions the engine may take its requirements in a small fraction of a cycle, while under others it may take it so slowly that diaphragm 9 has been hardly stopped by the back pressure from the carburetor before arm 23 again pulls it downward on the next intake stroke. Thus the duration of the effective output stroke is a variable fraction of the pump cycle, bearing no fixed relation to the amount of fuel pumped.

On the other hand, lost motion during the intake stroke is taken up before new fuel starts to enter chamber 2, so that the effective part of the intake stroke, or the effective intake period, which may be defined as that part in which fuel is actually entering chamber 2, always begins at a point determined only by the fuel volume pumped out on the previous output stroke, and always ends at the bottommost position of the diaphragm 9, irrespective of any lost motion due to wear in the latter. Since the intake stroke is positive and in a definite relation to the travel of the engine, the effective part of it is a fraction of the full pump cycle depending only on the amount of fuel pumped out during the preceding output stroke.

To illustrate, suppose that the demands of the engine require that 1/25,000 gallon be supplied to it by the fuel pump, per cycle of the latter. Then the pump supplies this during one output stroke, and takes in an equal amount of fresh fuel during the next intake stroke.

This intake stroke may require, for example, 1/10 of a cycle of the pump, which under all conditions is equivalent to 1/25,000 gallon, but the output stroke may be found to vary from, say, 1/10 cycle to 1/4 cycle, depending on speed and other factors which may affect the proportion of a cycle necessary to allow 1/25,000 gallon to enter the carburetor.

Thus the fraction of a cycle in which fuel is being taken in may be interpreted in terms of fuel pumped per cycle, while the fraction of a cycle during which fuel is being expelled bears no fixed relation to this quantity. Therefore, if the effective intake period can be measured as a fraction of the full pump cycle, this fraction may be made to represent fuel pumped per cycle, which is equivalent to fuel consumed per cycle, which in turn may be interpreted in terms of distance traveled per unit of fuel consumed, or miles per gallon.

Figures 2, 3, 4:
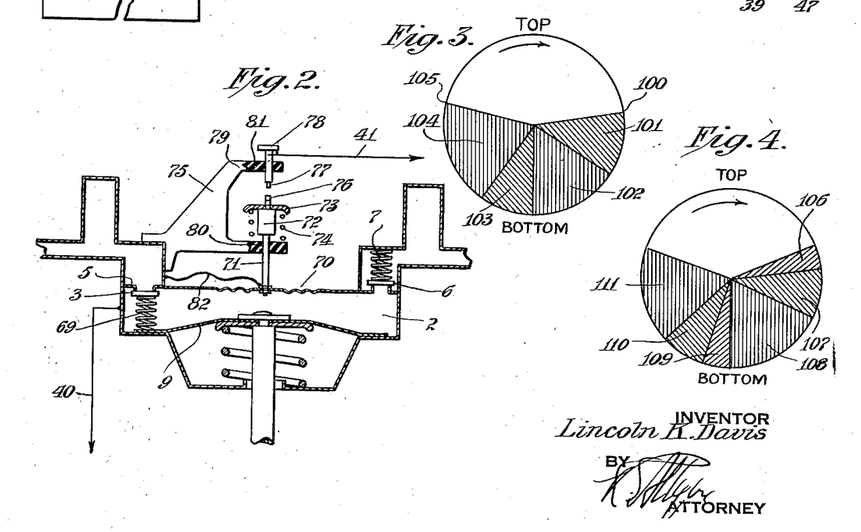
Fig. 2 shows a portion of a feed pump embodying an alternative form of my invention.
Fig. 3 illustrates diagrammatically the cycle of operation of the form of my invention displayed in Fig. 1.
Fig. 4 illustrates diagrammatically the operating cycle of the form of my invention displayed in Fig. 2.

Referring now to Fig. 3, I have here indicated a complete pump cycle from the top to the bottom of its stroke and back again principally in order to show roughly the periods of fuel flow and of lost motion, disregarding the minor effects due to the operation of the valves which effects substantially offset each other between the intake and output strokes. The right hand half is the intake and the left hand the output stroke, respectively.

At point 100 the diaphragm starts downwards. Shaded portion 101 represents lost motion taken up before fuel enters, portion 102 the entry of fuel, and portion 103 the lost motion before the fuel is ejected, as indicated by portion 104. At point 105 the back pressure from the carburetor stops the diaphragm motion.

The inlet valve 3 may be employed directly to measure the effective intake period, in a manner presently to be explained, and thus to permit the desired indication, if it is constructed as shown, and caused to control a suitable electrical circuit, hereinafter to be described. The valve 3 and its seat 5 are made of electrically-conductive material, the seat 5 being grounded to the pump body 1. Attached to the valve 3 is a stem 43, which moves in an insulating guide 42 having fuel passages 44.

Stem 43 is provided with a collar 43' near its upper end, which limits the amount of opening of the valve 3 by striking against the insulating guide 42. The degree of opening is set at such a point that valve 3 will open always to a maximum under all condidtions of speed and fuel intake which are of interest, and at the same time allow the fuel requirements to enter chamber 2.

Attached to the upper end on the stem 43 is a tension spring 4, the upper end of the latter being fastened to a post 36, which passes through the wall of the dome 12, but is insulated from it by the bushing 37, which fits snugly to prevent air or fuel leakage at this point. Spring 4 thus tends to hold valve 3 against its seat 5 not only in mechanical, but also in electrical contact therewith.

The contact surfaces of the valve 3 and its seat 5 are not necessarily flat, as illustrated, but they may be conical or otherwise shaped to give a wiping or wedging action, to promote good electrical contact, as well as an effective fluid sealing action, when closed.

As the area of valve 3, if made larger, increases in proportion to the square of its diameter, thus increasing the opening effect of a given fluid pressure in the same ratio, and as only a certain electrical contact area is necessary for a given current flow, regardless of the size of the valve, the tension of spring 4 may be increased in a like ratio without imposing any added strain on diaphragm 9, and thus the per-unit-area contact pressure may be increased, in order to insure good electrical contact. Therefore it is desirable but not necessary that valve 3 be of a relatively large diameter.

The effective portion of the intake stroke starts at the instant that valve 3 leaves its seat, and ends when diaphragm 9 has reached its bottommost position. At this point fuel stops flowing, and inlet valve 3 is open to its widest limit. As diaphragm 9 starts its upward motion or output stroke, it remains bulged inwardly by virtue of the atmospheric pressure below it, so long as the pressure in chamber 2 is less than atmospheric, which it will be while valve 3 is open, for the pressure in air dome 12 is also less than atmospheric, or else fuel would not flow into it from tank 10. Therefore, as diaphragm 9 begins to move upward, fuel starts to re-enter air dome 12 through valve 3 under atmospheric pressure transmitted through diaphragm 9 from the outside to the fuel in chamber 2, since, as just stated the pressure in air pump 12 is less than atmospheric pressure.

Valve 3 has already started to close under the influence of spring 4, and as the reverse fuel flow is in the same direction as the motion of the valve, it accelerates the closing action of the latter to a degree depending on the velocity of this reverse flow. As this velocity is proportional to the speed of operation of the pump, the period of closing of valve 3 is essentially a constant fraction of the pump cycle, and thus is substantially independent of the speed of operation of the pump.

Under given conditions of fuel pumped per cycle, the greater is the speed at which successive cycles occur, the more rapid is the motion of diaphragm 9, and also the greater is the fuel velocity in the piping 11. This higher velocity requires a correspondingly lower pressure, with respect to atmospheric, in air dome 12, in order that it be maintained, so that at high speeds this relatively lower pressure aids the reverse flow of fuel and assists the rapid closing of valve 3.

Thus the open period of the inlet valve may be considered as equal to the effective intake period plus the valve closing period. The first has been shown to be equivalent to fuel pumped per cycle, in terms of a fraction or percentage of a pump cycle; the second is a constant, also constituting a certain percentage of the pump cycle.

As the indicating meter which is to be described gives readings based on this percentage of the pump cycle, the second factor above, being constant at all speeds, simply increases the readings of the meter by a fixed amount at all speeds, and this amount may be allowed for in the initial calibration of the instrument.

Therefore, the open period of the inlet valve 3 may be taken as a measure of the effective intake period, being in a definite relation to it. As has been shown, the effective intake period per cycle can be interpreted in terms of miles per gallon, so that the open period of the inlet valve 3 may be similarly interpreted, and an instrument indicating it calibrated to read in miles per gallon.

The indicating meter 38 consists of a shaft 51, suspended between bearings (which are not shown), this shaft having fixed to it a pointer 53, adapted to move over a scale 54, and an armature 52 of soft iron made in an elongated shape, the shaft, pointer, and armature together forming a balanced moving element. This moving element is centered at the approximate crossing point of the lines of force produced by two electromagnets 49 and 50 between their respective pole pieces 57, 58 and 55, 56, in such a manner that when electromagnet 50 is energized, the armature 52 attempts to align itself between pole pieces 55 and 56, and when electromagnet 49 is energized, the armature 52 attempts to align itself between pole pieces 57 and 58.

Pole pieces 57 and 58 are somewhat wider than pole pieces 55 and 56, to enhance the action of electromagnet 49, which is intermittently energized, as explained later.

Electromagnet 50 is normally continuously energized from a battery 39, which latter may conveniently be the accumulator employed in connection with the usual automobile motor. One side of the battery is also grounded to the pump body 1 by means of a wire 40, of a suitable nature. The other side of the battery is connected, through a resistance 45, to post 36 by means of a wire 41, and the side of resistance 45 away from the battery is connected to electromagnet 49 by means of a wire 48. The other side of electromagnet 49 is connected to the same side of battery 39 as is grounded to pump body 1, by means of wire 46.

Tracing through the connection, it is evident that when valve 3 is closed, i. e., when it is in contact with its seat 5, electromagnet 49 is short-circuited, and resistance 45 is thrown directly across battery 39, electrically speaking. Since electromagnet 50 is energized continuously, armature 52 is affected by it alone, and assumes a position such that pointer 53 gives some such reading as 59 on scale 54. To aid in the explanation, assume that electromagnet 50 is connected so that pole piece 55 is a north pole, and pole piece 56 is a south pole, and that electromagnet 49 is connected so that, when it is energized, pole piece 57 is a north pole, and pole piece 58 a south pole.

When valve 3 is open, that is, when it is not in contact with its seat 5, it will be seen that the voltage of battery 39 is impressed across electromagnet 49 through resistance 45. Armature 52 is then acted upon by both electromagnets 50 and 49, so it turns in a clockwise direction and assumes an intermediate position such that pointer 53 indicates some such reading as 60 on scale 54, due to the fact that the combined magnetic field runs approximately from top left to bottom right.

Since both electromagnets are energized from the same battery 39, it is apparent that variations in its potential will affect the strength of both magnetic fields proportionately, and as the moving element is balanced and not subject to any fixed forces, such as those produced by gravity, springs, etc., it will be seen that the positions of the armature 52 and the corresponding indications of the pointer 53 are determined by magnetic forces alone, and are substantially independent of fluctuations in the voltage of battery 39. This is important in the case where the battery also operates other devices, and is periodically charged and discharged, for voltage variations in circuits connected to the battery may then be of sufficient magnitude to introduce serious errors in the readings of any indicating instrument connected to such circuits and having no provision for an inherent compensation of such variations.

It is evident that if there are no variations in the current source to be dealt with, as in the case where a battery or source of current which delivers a constant potential at all times or has provision for adjustment to a predetermined potential is used, 50 readily may be a permanent magnet instead of an electromagnet, and in such a case, electromagnet 49 will produce, when energized, the same field intensity always. Thus the relative field strengths of magnets 49 and 50 will be constant, as they are in the case assumed wherein potential fluctuations occur, and this substitution will in no way affect the operation of the meter 38 by the valve 3. On the other hand, it will be evident to those skilled in the art that the action of the meter just described is in no way dependent, as far as its cooperation with the other elements of my invention is concerned, upon the presence of the compensating action just described. Fig. 1 illustrates equally well the case of the permanent magnet, if element 50 is described as being of magnetized steel, instead of soft iron and if the wires shown connecting element 50 to battery 39 be deleted. The use of meters thus compensated to allow for variation in a current source is well known and it will be evident that a simple non-compensated meter can be employed in lieu of the compensated type above described. The only objection to the use of such non-compensated type, is that fluctuations in the battery circuit will give rise to errors in the pointer indications of such a meter. In the art of electrical measurement many devices are known other than the compensatory circuit just described, which can maintain a substantially constant effective output voltage of an electrical battery. Such devices and methods do not form part of the subject matter of this invention and accordingly it is not considered necessary to illustrate such methods or devices. The method of compensation just described is merely to be considered as illustrative of one possible method which may be employed.

When the fuel pump is operating and valve 3 is alternately opening and closing, it is evident that pointer 53 is alternately urged to assume position 60 and position 59. As under the usual conditions in an automobile the operation of valve 3 takes place rapidly, for instance about 1,000 times a minute at a speed of travel of 40 miles per hour, the inertia of the armature 52 and pointer 53 prevents their instantly following the changes in direction of the magnetic forces, so that pointer 53 shows an intermediate reading, such as at 61. To reduce the fluctuations of the needle any damping means such as immersing the entire mechanism in suitably viscous oil or other well known means for securing this same result may be used. These elements, if used, are not per se modifications of my invention but are elements old and well known and accordingly the drawings illustrate merely the new and novel matter constituting my invention.

It will be evident that position 61 is not fixed, but is dependent on the relative duration of the periods of energizing of electromagnet 50 alone, and of the energizing of both electromagnets 50 and 49 at the same time. Since electromagnet 50 is energized continuously, position 61 will depend on the fraction of the total period considered, for example one cycle of the fuel pump, during which electromagnet 49 is also energized, which is the same as the fraction of a full pump cycle during which valve 3 is open.

For instance, suppose that the reading 61 shown is obtained when valve 3 is open for one-tenth of a cycle of the fuel pump. If now the fuel consumption of the engine increases so that valve 3 is open for one-fifth of a cycle, it will be seen that electromagnet 49 will be energized for one-fifth of a cycle, that is, for a longer fraction of a cycle, so that pointer 53 will be moved clockwise by the action of electromagnet 49 to a new position such as 62. If the fuel consumption decreases so that valve 3 is open for, say, one-fifteenth of a cycle, electromagnet will be energized for this shorter fraction of a cycle, and pointer 53 will be moved counterclockwise to some other such position as 63.

If instead of the circuit given, meter 38 had been connected directly in series with the battery and the contacts upon the pump, so that electromagnet 49 were energized when valve 3 were closed, and de-energized when valve 3 were open, instead of the reverse as explained above, we would then have a much less desirable condition which may briefly be outlined as follows and which does not require any illustration, since it is not a preferred embodiment of my invention. Under such conditions the electrical windings of meter 38 would have to be designed to withstand the full voltage of battery 39 when valve 3 were closed. This would be for a large percentage of the pump cycle, and always more than one-half, as valve 3 cannot be open as much as fifty percent of a cycle, for the pump intake stroke occupies one-half of the cycle only, and due to excess capacity provided, and lost motion in diaphragm 9, the effective part of the intake stroke cannot take up as much as this one-half cycle.

Therefore the readings of meter 38 would represent the full battery voltage, reduced by an amount equivalent to the percentage of a cycle during which inlet valve 3 were open, and as the latter is less than fifty percent, the meter readings would have to fall between figures representing one hundred percent and something over fifty percent of the battery voltage, resulting in a limited meter scale. The description just given is not of any modification of my invention but is an exposition of the reason why a shunt instead of a series contact is employed.

However, by using the connection given, meter 38 is made effectively more sensitive, that is, it is caused to become so sensitive that the full battery voltage acting for fifty percent of a cycle or less will give a full scale reading, thus spreading out the scale so that small changes in the percentage of the effective intake period will produce larger changes in scale reading than if the meter were made and connected as described immediately above.

From what has been written, it is apparent that readings of the pointer 53 on the scale 54 bear a definite relation to the fraction of a complete pump cycle during which inlet valve 3 is open, and that the greater this fraction is, that is, the greater the fuel consumption per cycle, the further the pointer 53 will move in a clockwise direction.

Since, as has been explained in detail previously, the fraction of a complete pump cycle during which inlet valve 3 is open is a measure of the fuel consumption per cycle, and since this may be expressed in terms of distance traveled per unit of fuel consumed, or in terms of miles per gallon, it will be seen that the readings of pointer 53 on scale 54 may be interpreted in terms of miles per gallon, and scale 54 so calibrated.

Therefore, it can be seen that my invention affords a device for indicating continuously the fuel consumption of an engine with respect to the distance traveled, the device being electrically actuated by the operation of fuel supplying means which function in proportion to the travel of the engine, and being substantially independent both of wear in the fuel supplying means and of changes of potential in the source of electrical energy, because of the compensatory effects above described.

Referring now to Fig. 2, instead of employing the inlet valve 3 to indicate the starting and ending of the fuel intake period, the electrical connections to this inlet valve may be dispensed with, and for spring 4 of Fig. 1 may be substituted a compression spring 69 to hold valve 3 against its seat 5, and pump chamber 2 may have in one wall a second flexible diaphragm 70, made of such material that it will not stretch or otherwise change appreciably in characteristics after repeated flexing.

Attached to diaphragm 70 is a rod 71, passing through an opening 80 in bracket 75, and carrying on its upper end a collar 72 having a flanged portion 73. Between the latter and bracket 75 is a compression spring 74 surrounding collar 72. Rod 71 has at its top end an electrical contact 76, which cooperates with a fixed electrical contact 77 to determine the circuit through meter 38 in the same manner as does inlet valve 3 and its seat 5 in the previously described construction of the form of Fig. 1.

Contact 77 is on the end of an adjusting screw 78, which is threaded through an insulating bushing 81 carried by the overhanging portion 79 of bracket 75, and is connected to the meter 38 by means of wire 41. Contact 76 connects to pump body 1 through rod 71 and diaphragm 70, or if the latter be made of a non-conducting material, a "pigtail" 82 may be provided to supply current thereto and pump body 1 connects to meter 38 through wire 40. Spring 74 exerts a force sufficient to lift diaphragm 70 upwards until contacts 76 and 77 are touching, but its strength relative to spring 69 is such that a pressure lower than atmospheric in chamber 2 will cause diaphragm 70 to move into the latter until collar 72 rests against bracket 75 adjacent to opening 80 before valve 3 will open, and valve 3 will close before diaphragm 70 will move outward again.

Outlet valve spring 7 exerts such a force that diaphragm 70 will return to its outermost position before outlet valve 6 will open. Since the motion of diaphragm 70 is constrained between definite limits, the innermost limit being determined by collar 72 and bracket 75 adjacent to opening 80, and the outermost limit being set by contacts 76 and 77, the volume displaced by diaphragm 70 within these limits is constant.

When diaphragm 9 starts its downward motion, lost motion due to stretching of the diaphragm material is first taken up, as explained previously. Next diaphragm 70 is drawn downward or inward to its limit, opening contacts 76 and 77 and actuating meter 38 as in the previous instance, and then inlet valve 3 opens and admits fresh fuel to chamber 2. At the end of the intake period, valve 3 closes, and on the upward stroke, diaphragm 9 moves far enough to take up any slack in the material of which it is made, as explained before, and diaphragm 70 moves upward or outward simultaneously to its limit, closing contacts 76 and 77, before outlet valve 6 opens and fuel is supplied to the engine. Thus diaphragm 70 operates immediately before and immediately after the operation of inlet valve 3, and although its motion results in a certain amount of lost pumping capacity, this amount is the same for the inlet stroke as it is for the output stroke, so is in the form of a constant which may be allowed for in the calibration of the scale 54. The operation otherwise is exactly similar to the previously described case in which the inlet valve 3 controls the circuit of meter 38.

Referring now to Fig. 4, a complete cycle of pump operation is here diagrammatically indicated, when my invention assumes the form displayed in Fig. 2.

The general arrangement of this diagram is similar to that of Fig. 3. On the input stroke, portion 106 shows the lost motion due to the pump diaphragm, 107 the lost motion due to the contact diaphragm and portion 108 the entry of fuel. On the output stroke, portion 100 shows the lost motion due to the pump diaphragm, portion 110 the lost motion due to the contact diaphragm and portion 111 the ejection of fuel.

Figure 5:
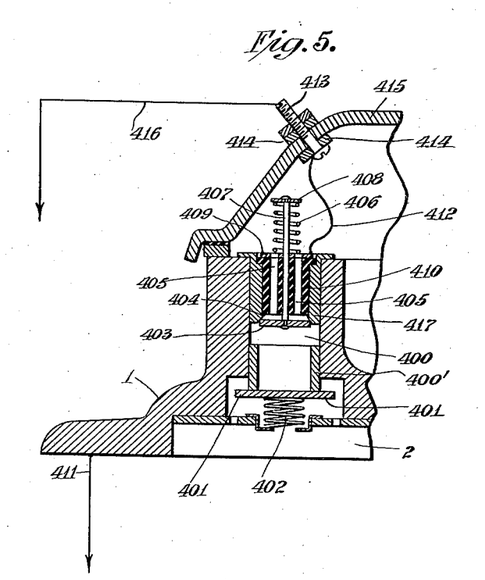
Fig. 5 illustrates a modification of the device of Fig. 1, to enable it to be applied as an accessory to a fuel pump assembly, rather than as an integral part thereof.

In Fig. 5 I have shown a still further modification of the electrically indicating form of my invention, which may be more readily applied to automotive engines already constructed and/or in use. In this figure I have merely illustrated such portions of the fuel intake system as are necessarily different from those shown in Figs. 1 and 2.

The fuel pump body I is provided with a comparatively elongated inlet passage 400. This passage is made of sufficient length to accommodate within it two separate intake valves. The lower intake valve 401 with its actuating spring 402 seats on sleeve 400' and serves to open and close the communication between the inlet passage and upper pump chamber 2 in a fashion similar to that already described in connection with Fig. 1. The upper portion of passage 400 contains a second valve provided with a usual valve head 403, valve seat 404 and fuel passages 405. These passageways are open at their upper extremities and communicate with a fuel line (not shown) in any suitable fashion, for example similarly to the intake valve connections described in the case of Fig. 1.

Valve spring 406 serves to control the operation of this upper valve in a fashion very similar to the action of spring 402 upon the lower valve. A valve stem 407 is provided at its upper extremity with a suitable retaining member 408 which serves to afford a mechanical connection between spring 406 and valve stem 407. The lower extremity of spring 406 rests upon a metal washer 409, which latter in turn is supported upon the upper surface of an insulating bushing 410 which also serves to line the interior surfaces of this valve structure.

Describing now the electrical portions of this device, I have indicated at 411 a lead wire extending from the valve body to the indicating meter. It is to be understood that the indicating meter used with this form of my invention may be of any suitable type, such as the one shown and described in detail in Fig. 1.

It is also to be understood that, as is usual in automotive motors, one terminal of the accumulator is permanently grounded to the engine frame, and since the fuel pump is likewise from an electrical viewpoint to be considered as constituting a portion of this frame, a special conductor such as that indicated at 411, may frequently be dispensed with. An electrical conductor 412 is provided and serves to connect metal washer 409 to the indicating meter through the intermediary of a terminal structure 413 which is provided with suitable insulating bushings 414, extending through an inlet air dome 415, which latter is customarily provided to mechanically protect fuel pumps of this type.

It is to be understood however that in case such air dome is not electrically conducting, inlet bushings 414 may be dispensed with, and it will also be apparent that any other suitable means may be provided to electrically connect conductor 412 adjacent the upper valve to conductor 416 which lies external the fuel pump and serves to conduct the current therefrom to the indicating meter.

Tracing the action of this form of my invention, it is to be noted that an electrical circuit exists from conductor 416 through terminal device 413, conductor 412 and metal washer 409. Metal washer 409 is an electrical contact with valve spring 406 and the latter in turn is in contact with valve stem 407. It is also possible of course to make electrical connection between conductor 412 and valve stem 407 by any other suitable means well known in the art. Valve stem 407 is in electrical contact with valve head 403 and the latter in turn affords contact to valve seat 404, only when the valve is closed. The portion indicated at 417, which may be termed the valve cage, is in electrical contact with pump body I and therefore the circuit is completed with valve seat 404 through this cage to the pump body and thence back to the indicating meter.

The operation of the upper valve of the device of Fig. 5 is in every way similar to that of the intake valve shown and described in Fig. 1 and accordingly any further detailed description thereof is thought unnecessary. The upper and lower valves of this device will operate substantially simultaneously, the lower valve representing the intake valve already existing in the automotive motor and which may be, accordingly, of any other suitable type, provided only that its law of response to the fuel pump cycle substantially accords with that previously described in connection with Fig. 1.

The chief reason for employing the upper valve of this device, is to afford a ready means of electrically interpreting the movements made by the lower valve and I have found that such an auxiliary electric contact valve may be placed in the fuel passage between the fuel tank and the usual intake valve of the fuel pump, without detracting in any substantial degree from the efficiency of the pump. As already described in connection with Fig. 1 a degree of mechanical driving effort is always available for the fuel pump in excess of the maximum which it may ever require and accordingly the mechanical work necessary to actuate the auxiliary contact valve of the device shown in Fig. 5 is readily supplied by the already existing pump drive. Likewise, as also previously explained, the fuel pump proper will adjust its effective stroke and work so always to deliver substantially the entire demand made thereupon by the motor which it feeds.

I have found therefore that the added presence of an auxiliary contact valve in the fuel line produces no alteration either in the theory or operation of my invention and accordingly the diagrammatic cycle represented by Fig. 3 applies equally to the form shown in Fig. 5.

It will be apparent to one skilled in the art that my invention is of widespread utility and that its use is not necessarily confined to the automotive field but is adaptable to many types of prime movers where a fuel passes through a pump on its passage from the fuel supply tank to the motor, the operation of which pump corresponds to the operation of the types above described.

It will be apparent that the engine load is not necessarily limited to a representation in terms of distance traveled by an automobile. For example since my invention basically shows the fuel consumption relative to the rotation of a driven shaft, it may be calibrated in terms of the fuel consumption per revolution of this shaft, or in terms of any other load whose value bears a mathematical relation to the rotation of such shaft.

My invention combines the desirable features of both the first and the second types of indicating devices set forth at the beginning of this specification and is substantially free from the errors and difficulties inherent in the first type by reason of the fact that the time factor is automatically cancelled out by the use of my invention, the inertia accentuating feature of the indicating mechanism serving to make this cancellation substantially complete.

My invention likewise affords substantially instantaneous readings and does not introduce directly into the engine feed system and as an integral part thereof any additional apparatus, whose presence would afford a possible source of engine failure, when and if any trouble developed in such apparatus. Previously proposed devices of the second type not only necessitated measuring apparatus which was directly introduced into the fuel feed system, but also such devices would give indications only at discrete intervals with comparatively wide intervals of time therebetween.

Likewise, my invention differs from other proposed devices of the second type, in that such devices admitted a predetermined and always uniform amount of fuel as a unit of measurement. With such a uniform rate of feed it is evident that the time spacing between indications would be a function of the rate of fuel consumption.

By the employment of apparatus according to my invention, however, the amount of fuel admitted is varied according to the rate of use thereof by the engine, and therefore under all conditions of actual road operation my invention will give indications which will follow changes of rate of fuel consumption at a practically instantaneous rate.

While the foregoing embodiments of my invention have illustrated a fuel pump of the diaphragm type, it will be evident to those skilled in the art that pumps of types other than the diaphragm type may be substituted therefor, by making such suitable modification as will be readily apparent and I have not illustrated such other forms, since they do not constitute an essential part of my invention.

Similar considerations apply to the indicating device shown in the other figures and it will be apparent to one skilled in the art that such other forms of my invention may be likewise modified in case that the method of pump operation is changed in the fashion just indicated.

The general principle of operation of my invention may be briefly stated as the measurement of the per-pump-cycle fuel requirements of the engine by which the pump is positively driven, in terms of the portion of a cycle in which the pump is actively operating upon the fuel in a definite relation to the work performed by the engine.

The scope of my invention is not confined to the precise embodiments above described but many modifications thereof will be apparent to those skilled in the art and accordingly I limit my invention only in accordance with the scope of the hereunto appended claims.

I claim:

1. A device for measuring the fuel consumption of an internal combustion motor relative to the work performed thereby, including a pump supplying fuel to said motor, said pump being of the variable stroke reciprocating type and having an inlet valve, means for driving said pump at a number of strokes per unit time proportional to the work performed by said motor, electrical signalling means attached to said valve and affording an electrical signal of one type when said valve is open and affording an electrical signal of another type when said valve is closed, and an electrical meter receiving both types of signals and displaying an indication corresponding to the relative length of time of persistence of the respective types of signals, integrated over a period of time sufficiently great to cause said indication to appear unchanging while the rate of consumption of fuel is constant.

2. An auxiliary device for attachment to the fuel pump of an engine, said pump having an inlet valve and being of the type which operates in proportion to the speed of the engine and of output variable with the fuel requirements of the engine per unit of travel thereof, said device serving as an indicator of the efficiency of said engine, and comprising an auxiliary valve inserted between said inlet valve and the fuel source, spring actuated means for causing said valve to open and close substantially in synchronism with the intake valve of said pump, electrical contact means actuated by the movements of said auxiliary valve, an electrical current supply connected to said contact means and indicating means connected to and actuated by the operation of said contact means so as to give indications proportional to the relative duration of the actuation and non-actuation periods of said contact means.

3. A fuel consumption indicator including a fuel pump having at least one chamber subject to varying pressures during the operation of said pump, a flexible wall comprising a portion of the boundary of said chamber, means for affording an electrical signal of one character when the pressure within said chamber is positive relative to atmospheric pressure, means for affording an electrical signal of another and distinct character when the pressure within said chamber is negative relative to atmospheric pressure and means for integrating and displaying the relative duration of said two distinct electrical signals.

4. An automotive indicator of distance travelled per unit of fuel consumed giving readings substantially instantaneous and substantially independent of any time factor, including pump means intermittently and cyclicly delivering fuel to the engine at a cyclic rate proportional to the speed of said engine, means for varying the amount of fuel delivered per cycle of said pump means according to the fuel requirements of the engine, said pump means being operated by said engine, means for deriving an intermittent electric current whose average value is proportional to the portion of each cycle that said pump means is taking in fuel and whose frequency is proportional to the frequency of said pump cycle and means for indicating the average value of said current, substantially independently of the frequency thereof.

5. A fuel consumption indicator including a fuel pump having at least one chamber subject to varying pressures during the operation of said pump, means for affording an electrical signal of one character when the pressure within said chamber is positive relative to atmospheric pressure, means for affording an electrical signal of another and distinct character when the pressure within said chamber is negative relative to atmospheric pressure and means for integrating and displaying the relative duration of said two distinct electrical signals.

6. Efficiency measuring apparatus for an engine including a reciprocating pump having inlet and outlet valves and supplying fuel to the engine at a rate proportional to the fuel consumption thereof, means driving said pump in fixed relation to the travel of said engine during a portion of the motion per cycle thereof, electrical contact means actuated by the fuel entering said pump, said last means causing a signalling impulse when fuel is passing said inlet valve, and no signalling impulse when fuel is not passing said valve, and integrating means actuated by a series of said signalling impulses, giving an indication proportional to the percentage of a complete cycle of said pump during which each signalling impulse exists.

7. Efficiency measuring apparatus for a prime mover deriving energy from liquid fuel, said apparatus comprising a reciprocating pump having inlet and outlet valves, said pump being operated by said prime mover in fixed relation during a portion of the intake stroke of said pump dependent on the fuel volume delivered to said prime mover during the preceding output stroke, and means for indicating said portion as a percentage of a complete cycle of said pump, said last mentioned means comprising an electrical meter, an electric circuit, and a pair of electrical contacts operated by said inlet valve in such manner as to control said electrical circuit and cause said electrical meter therein to be energized when said valve is open, and to be shunted when said valve is closed, whereby the average indication of said meter is proportional to the said fuel volume delivered to said prime mover during the preceding output stroke.

8. An automotive indicator of distance travelled per unit of fuel consumed by the engine and giving readings substantially instantaneous and substantially independent of any time factor, including pump means intermittently and cyclicly delivering fuel to the engine at a cyclic rate proportional to the speed of said engine, the amount of fuel delivered per cycle of said pump means varying in accordance with the fuel requirements of the engine, said pump means being operated by said engine, means for deriving intermittent electric currents whose time durations are proportional to the portions of the pump cycles that said pump means is taking in fuel and whose frequency is proportional to the frequency of said pump cycle and an electric meter means responsive to said electric currents and calibrated to indicate the distance traveled per unit of fuel consumed.

9. For use in conjunction with an internal combustion engine, a variable stroke fuel pump for feeding fuel to the engine, constant stroke driving means for actuating the pump, the driving means being effective on the pump during a fraction of the driving means cycle and being ineffective on the pump during the remaining fraction of said cycle, an electric meter, and means to automatically energize the meter in accordance with the division of said driving means cycle into effective and ineffective fractions.

10. For use in conjunction with an internal combustion engine, a variable stroke fuel pump for feeding fuel to the engine, constant stroke driving means for actuating the pump, the driving means being effective on the pump during a fraction of the driving means cycle and being ineffective on the pump during the remaining fraction of said cycle, a source of voltage, an electric meter, means to intermittently energize the meter from said source of voltage, the intermittent character of the energization being in accordance with the division of said driving means cycle into effective and ineffective fractions, and automatic means to substantially compensate for limited fluctuations of the voltage of said source.

LINCOLN K. DAVIS.